United States Patent
Chung et al.

(10) Patent No.: US 7,933,575 B2
(45) Date of Patent: Apr. 26, 2011

(54) CIRCUIT FOR SETTLING DC OFFSET IN DIRECT CONVERSION RECEIVER

(75) Inventors: Yuan-hung Chung, Hsinchu County (TW); Chia-hsin Wu, Shulin (TW); Shou-tsung Wang, Sinying (TW)

(73) Assignee: Mediatek, Inc., Hsin-Chu (TW)

( * ) Notice: Subject to any disclaimer, the term of this patent is extended or adjusted under 35 U.S.C. 154(b) by 657 days.

(21) Appl. No.: 12/035,095

(22) Filed: Feb. 21, 2008

(65) Prior Publication Data

US 2009/0212839 A1    Aug. 27, 2009

(51) Int. Cl.
*H04B 1/10* (2006.01)
*H04K 3/00* (2006.01)
(52) U.S. Cl. ......... 455/307; 455/324; 327/552; 327/559
(58) Field of Classification Search ............... 455/296, 455/307, 324; 327/552, 553, 559; 333/171, 333/72, 175
See application file for complete search history.

(56) References Cited

U.S. PATENT DOCUMENTS 6,784,727 B1* 8/2004 Cao et al. ............... 327/553
2003/0224752 A1* 12/2003 Rawlins et al. ........... 455/307
* cited by examiner

*Primary Examiner* — Lee Nguyen
(74) *Attorney, Agent, or Firm* — Kirton & McConkie; Evan R. Witt

(57) ABSTRACT

The present invention discloses a circuit for settling DC offset and controlling RC time-constant in a direct conversion receiver. The circuit includes a variable resistive unit for providing a continuously or non-continuously variable resistance in the direct conversion receiver. The variable resistive unit can provide the variable resistance by utilizing a controllable transistor or a plurality of resistors. Accordingly, the variable resistive unit can be coupled to a capacitor for constituting a high pass filter, which is capable of rapidly settling DC offset in a direct conversion receiver.

20 Claims, 9 Drawing Sheets

CIRCUIT FOR SETTLING DC OFFSET IN DIRECT CONVERSION RECEIVER

FIELD OF THE INVENTION

The present invention generally relates to a circuit for settling DC offset and controlling RC (resistance-capacitance) time-constant in a direct conversion receiver, and more particularly, to a variable resistive unit for settling DC offset in a direct conversion receiver.

BACKGROUND OF THE INVENTION

In a wireless communication system, a transmitter is used for transmitting modulated radio frequency (RF) signals and a receiver is used for receiving an RF signal and processing the received RF signal. A zero intermediate frequency radio device, zero-IF or called "direct conversion", is commonly used in a radio frequency communication system. A zero-IF receiver utilizes a local oscillator to generate a carrier frequency for down-converting the RF signals into base-band signals. However, the DC-offset often occurs in the radio frequency communication system when the RF signals are directly converted into base-band signals.

Please refer to FIG. 1. U.S. Pat. No. 6,442,380 discloses a zero intermediate frequency radio device, which is used for providing a direct conversion down converter with AC-coupled stages. The down converter 1 includes a low noise amplifier (LNA) 101, a mixer 102 and an AC-coupler 103. The AC-coupler 103 includes a capacitor C and a variable resistor R. A first end of the capacitor C is connected to an output node Vout, and a second end of the capacitor C is connected to the output end of the mixer 102. A first end of the variable resistor R is connected to the output node Vout, and a second end of the variable resistor R is connected to a node 120 for receiving a bias voltage. The AC-coupler 103 further includes an end 112 for receiving a control signal in order to determine the equivalent resistance of the variable resistor R. The low noise amplifier 101 includes an input end connected to an input node Vsig for receiving an AC signal, and an output end connected to the input end of mixer 102. The mixer 102 further includes an end 111 for receiving a local oscillator signal. The capacitor C and the resistor R constitute the AC-coupler 103 used for providing a function of high pass filter.

Please refer to FIG. 2. U.S. Pat. No. 6,784,727 discloses a continuous cut-off frequency switching circuit 2, which is used for fast-settling DC-offset. The circuit 2 includes a first capacitor C1, a second capacitor C2, a first variable resistor R1, a second variable resistor R2 and a continuous variable resistance control circuit 201. A first end of the first capacitor C1 is connected to a first input node Vin1, and a second end of the first capacitor C1 is connected to a first output node Vout1. A first end of the second capacitor C2 is connected to a second input node Vin2, and a second end of the second capacitor C2 is connected to a second output node Vout2. A first end of the first variable resistor R1 is connected to the first output node Vout1, and a second end of the first variable resistor R1 is connected to a common mode voltage source Vcm. A first end of the second variable resistor R2 is connected to the second output node Vout2, and a second end of the second variable resistor R2 is connected to the common mode voltage source Vcm. The continuous variable resistance control circuit 201 connected to the node at the Vcm for controlling the resistance of variable resistors R1 and R2. The input signals of circuit 2 is a differential signal pair, the DC offset within the input signals can be removed by the continuous cut-off frequency switching circuit 2.

In wireless communication, DC offset settling circuit can be treated as a kind of high pass filtering circuit. A DC offset settling circuit is required to provide a controllable variable resistance in a direct conversion receiver for rapidly canceling DC offset.

SUMMARY OF THE INVENTION

It is an object of the present invention to provide a circuit for settling DC offset and controlling RC response in a direct conversion receiver.

It is another object of the present invention to provide a variable resistive unit with discrete mode which is capable of providing an non-continuously variable resistance.

It is still another object of the present invention to provide a variable resistive unit with continuous mode which is capable of providing a continuously variable resistance of the variable resistive unit.

It is still another object of the present invention to provide a variable resistive unit, wherein the equivalent resistance of the variable resistive unit is determined by a control signal from a signal control unit.

According to the above objects of the present invention, there is provided a circuit for settling DC offset and controlling RC time-constant in a direct conversion receiver. The circuit includes a variable resistive unit for providing a continuously or non-continuously variable resistance. The variable resistive unit may provide the variable resistance by utilizing a controllable transistor or a plurality of resistors. The variable resistive unit can be coupled to a capacitor to constitute a high pass filter, which is capable of rapidly settling DC offset in a direct conversion receiver.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

The preferred embodiments of present invention will now be described more specifically with reference to the following drawings. It is to be noted that the following description of the preferred embodiments of the present invention are presented herein for purpose of illustration and description only and it is not intended to be exhaustive or to be limited to the precise form disclosed.

Figure 1:
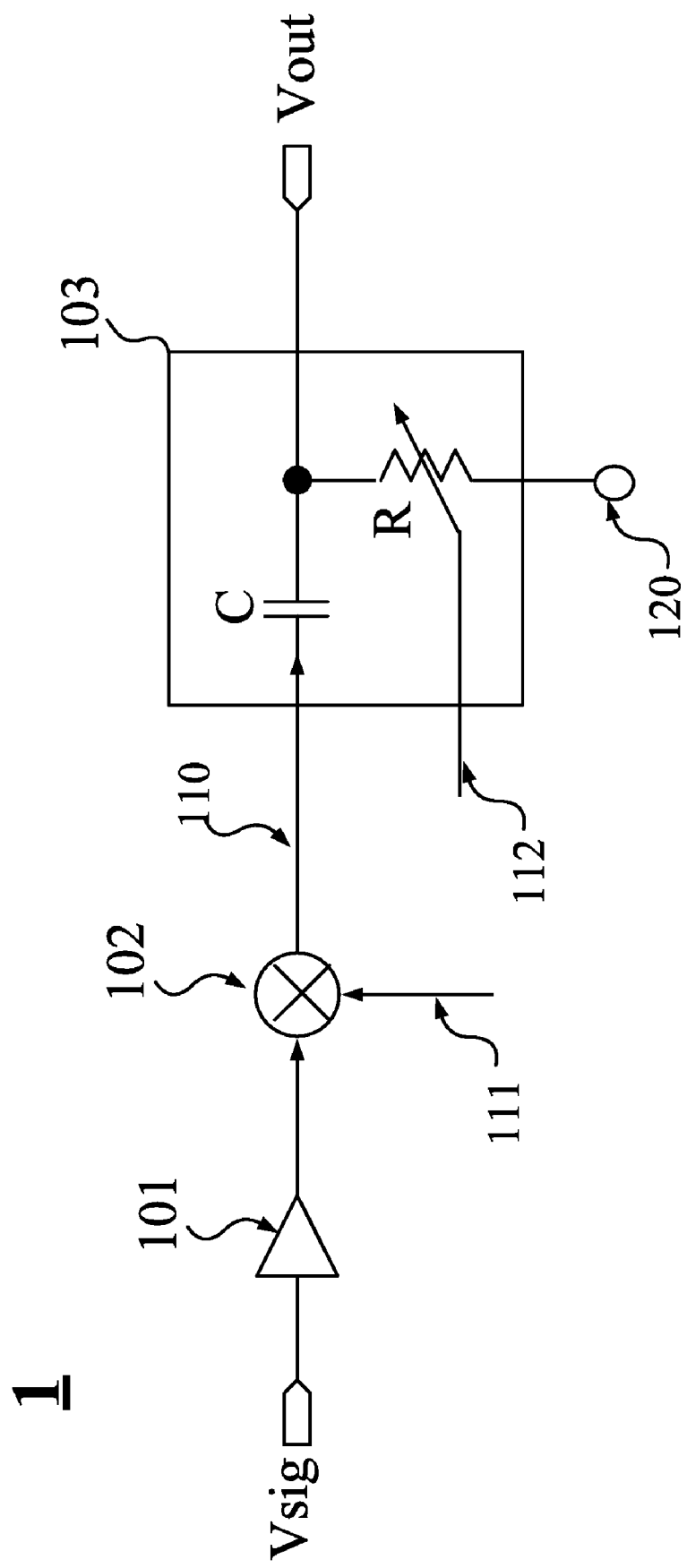
FIG. 1 shows a conventional direct conversion down converter with AC-coupled stage.
Figure 2:
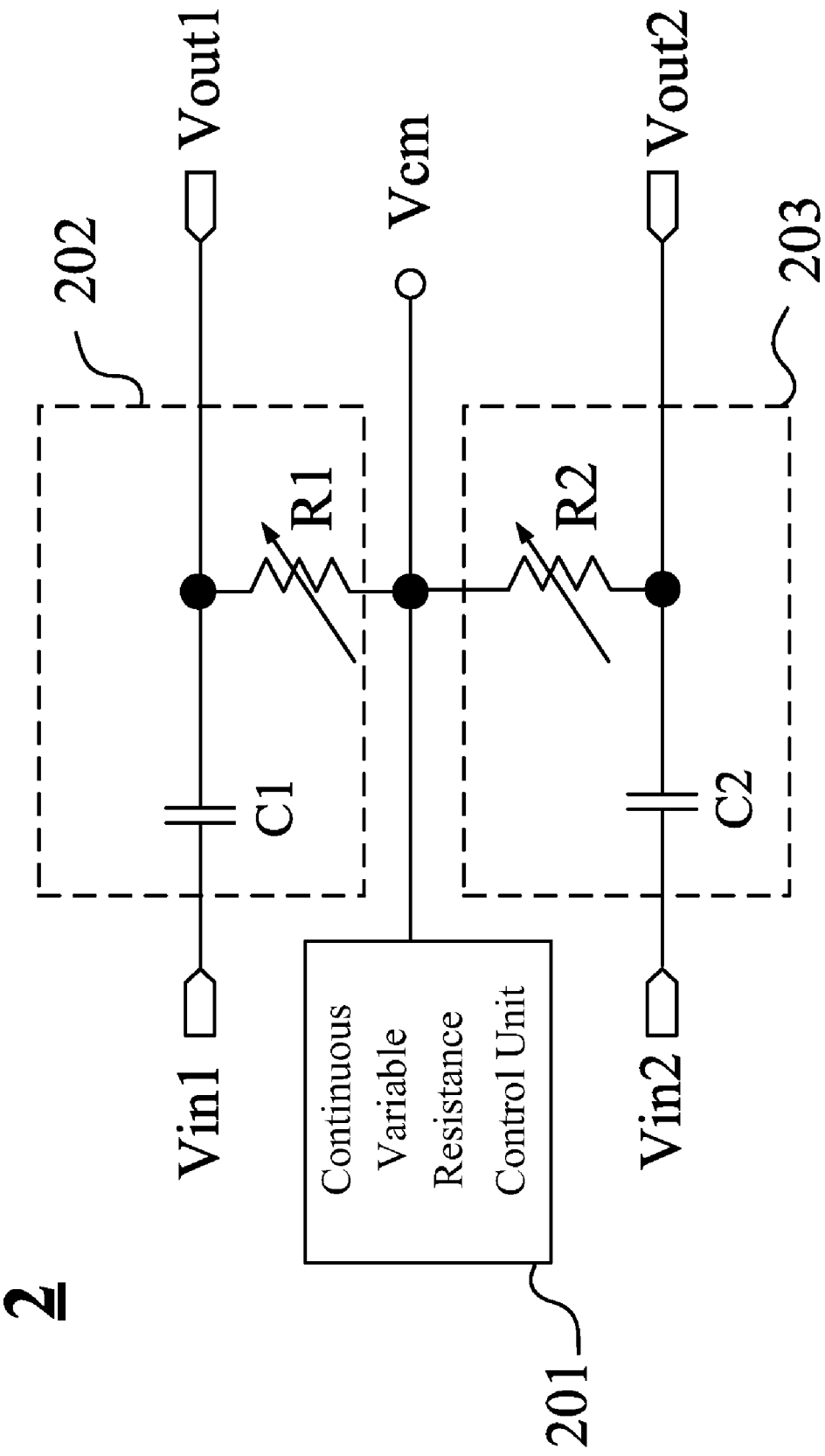
FIG. 2 shows another conventional continuous cut-off frequency switching circuit of AC coupling.
Figure 3:
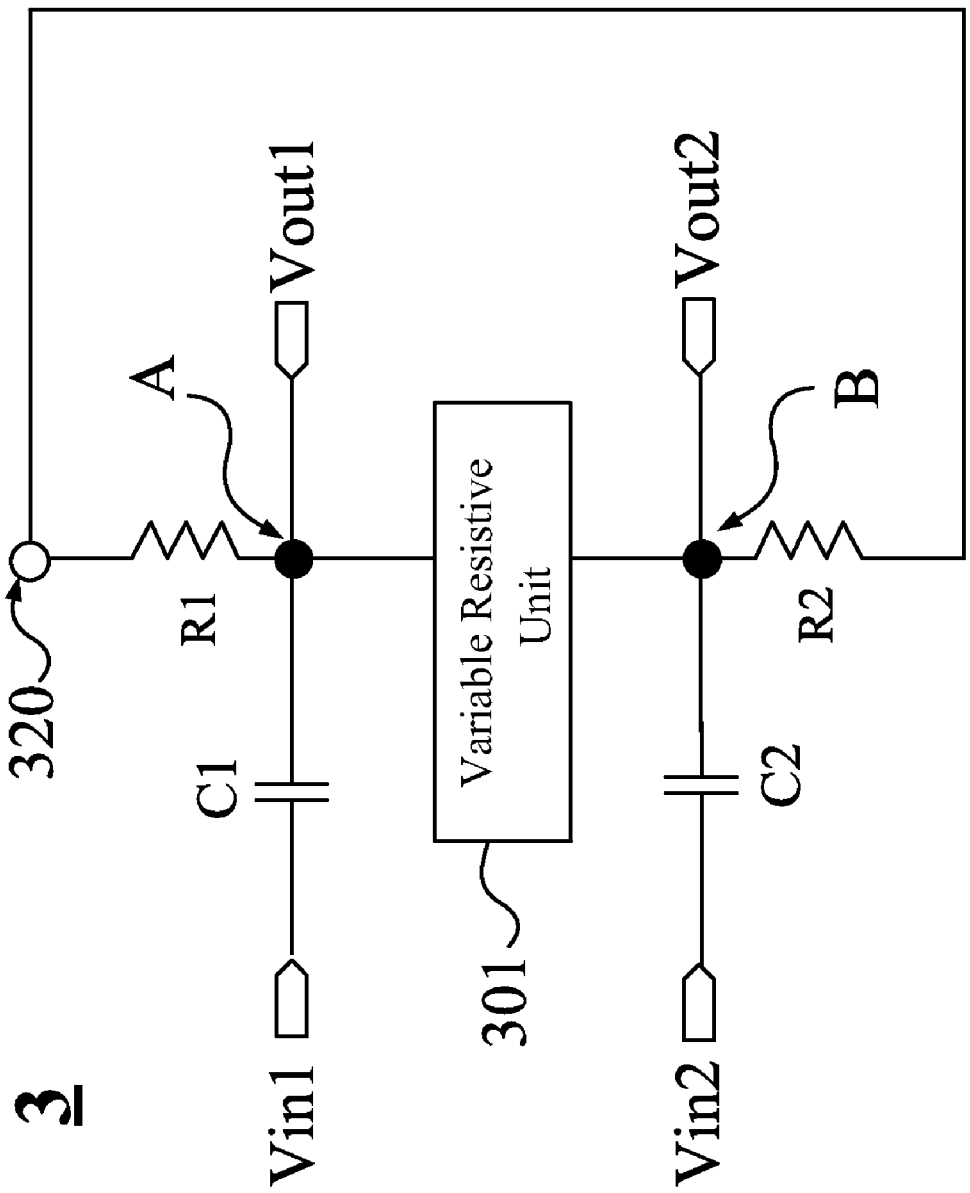
FIG. 3 is a block diagram illustrating a DC offset settling circuit, wherein a variable resistive unit is connected between the two-output nodes in accordance with the present invention.

FIG. 3 is a block diagram illustrating a DC offset settling circuit 3 used in a direct conversion receiver. A variable resistive unit 301 is connected between two output nodes Vout1 and Vout2. The DC offset settling circuit 3 includes a node 320 for receiving a bias voltage, a couple of input nodes Vin1 and Vin2 for receiving a differential radio frequency signal pair, a couple of output nodes Vout1 and Vout2 for outputting an output signal pair, a couple of resistors R1 and R2 for protecting the DC offset settling circuit 3 from overloading, two capacitors C1 and C2 for adjusting logic level of the bias voltage, and the variable resistive unit 301 for providing a variable resistance. The capacitor C1 is connected between the input node Vin1 and a node A. The capacitor C2 is connected between the input node Vin2 and a node B. The resistor R1 has a first end connected to the node 320 and a second end connected to the node A. The resistor R2 has a first end connected to the node 320 and a second end connected to the node B. The variable resistive unit 301 has a first end connected to the node A and a second end connected to the node B. The nodes A and B are respectively connected to the output nodes Vout1 and Vout2. The equivalent resistance of the variable resistive unit 301 and the resistors R1, R2 cooperated with the capacitors C1, C2 constitute the DC offset settling circuit 3, i.e. a high pass filter circuit. Accordingly, the DC offset settling circuit 3 is a high pass filter circuit with a variable resistance, in other words, the DC offset settling circuit 3 has a variable RC time-constant for providing a variable cut-off frequency. Therefore, the DC offset settling circuit 3 with the variable cut-off frequency is capable of rapidly canceling the DC offset within a directly down converted signal when the DC offset settling circuit 3 is applied in a RF direct conversion receiver.

Figure 4A:
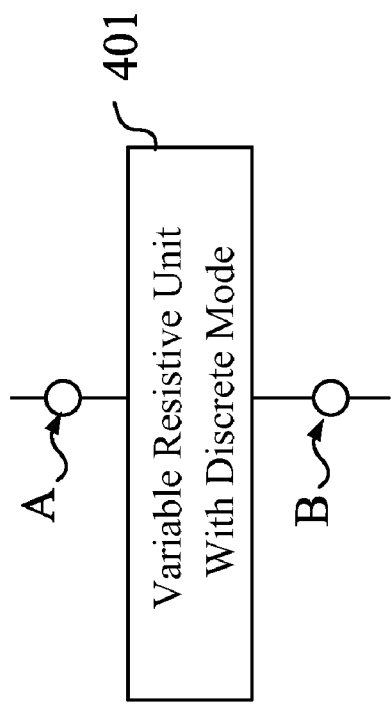
FIGS. 4a and 4b respectively illustrate two embodiments of the variable resistive unit of FIG. 3.
Figure 4B:
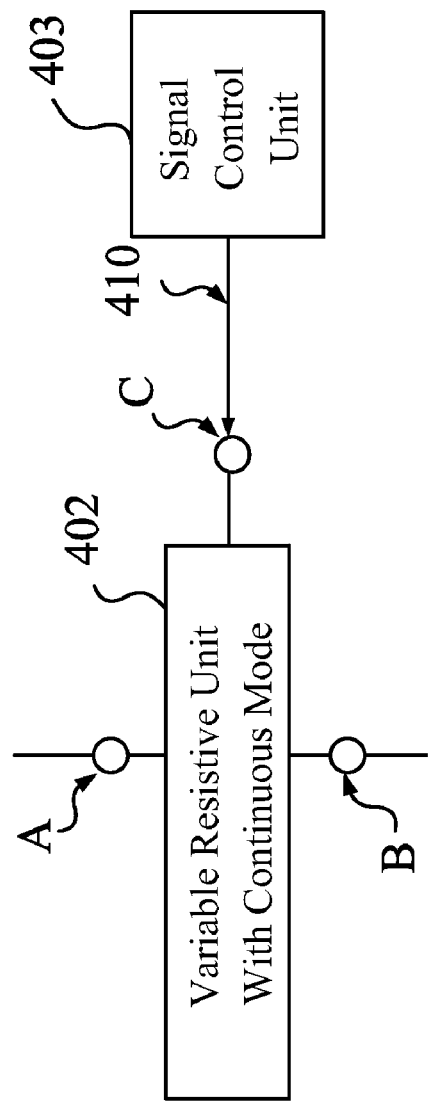

FIGS. 4a and 4b illustrate two embodiments of the variable resistive unit 301 of FIG. 3. In FIG. 4a, a variable resistive unit 401 with discrete mode provides a non-continuously variable resistance. The variable resistive unit 401 is connected between the nodes A and B, wherein the variable resistive unit 401 provides a non-continuously variable resistance between the nodes A and B. The details will be further described later. In FIG. 4b, a variable resistive unit 402 with continuous mode provides a continuously variable resistance. A signal control unit 403 provides a control signal 410 to a node C for determining an equivalent resistance of the variable resistive unit 402. The variable resistive unit 402 is connected between the nodes A and B, wherein the variable resistive unit 402 provides a continuously variable resistance between the nodes A and B (details later).

Figure 5:
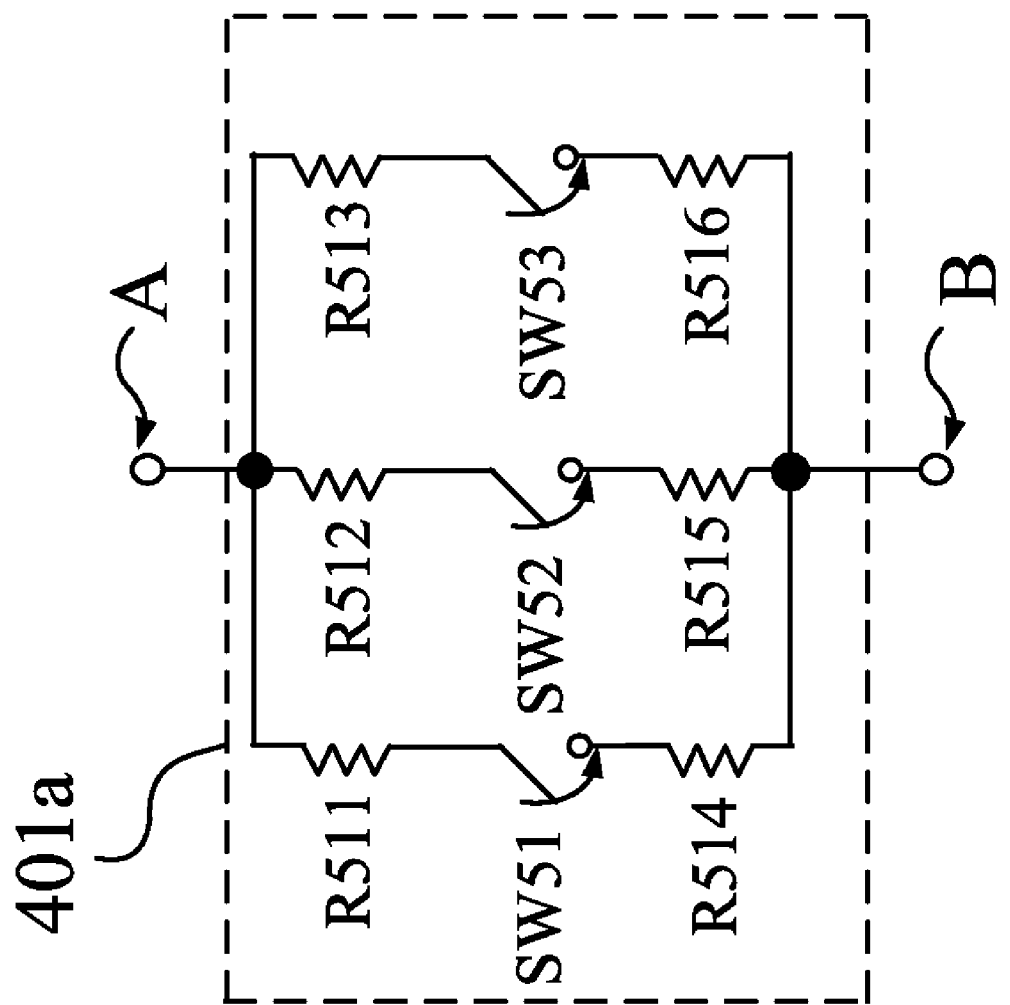
FIG. 5 illustrates an embodiment of the variable resistive unit with discrete mode in accordance with the present invention.

FIG. 5 illustrates an embodiment of the variable resistive unit 401 with discrete mode (see FIG. 4a) in accordance with the present invention. A variable resistive unit 401a comprises several sets of resistors. Those resistor sets are connected in parallel with each other, wherein each set comprises at least one switch and a plurality of resistors which are connected in series. The number of switches are corresponded with the number of resistor sets. In the present embodiment, the variable resistive unit 401a comprises a plurality of resistors R511-R516 and a plurality of switches SW51-SW53. In a first resistor set, the resistors R511, R514 are connected in series and switch SW51 is connected in series with the resistors R511 and R514. In a second resistor set, the resistors R512, R515 are connected in series and switch SW52 is connected in series with the resistors R512 and R515. In a third resistor set, the resistors R513, R516 are connected in series and switch SW53 is connected in series with the resistors R513 and R516. The first, second and third resistor sets are connected in parallel between nodes A and B (also referred to FIG. 3). The plurality of switches SW51-SW53 are used for determining equivalent resistance of variable resistive unit 401a. By controlling the on/off states of the respective switches SW51-SW53, the variable resistive unit 401a is able to provide several different resistances. Therefore, the variable resistive unit 401a is capable of providing a discrete variable resistance between the nodes A and B according to the on/off states of switches SW51-SW53.

Figure 6:
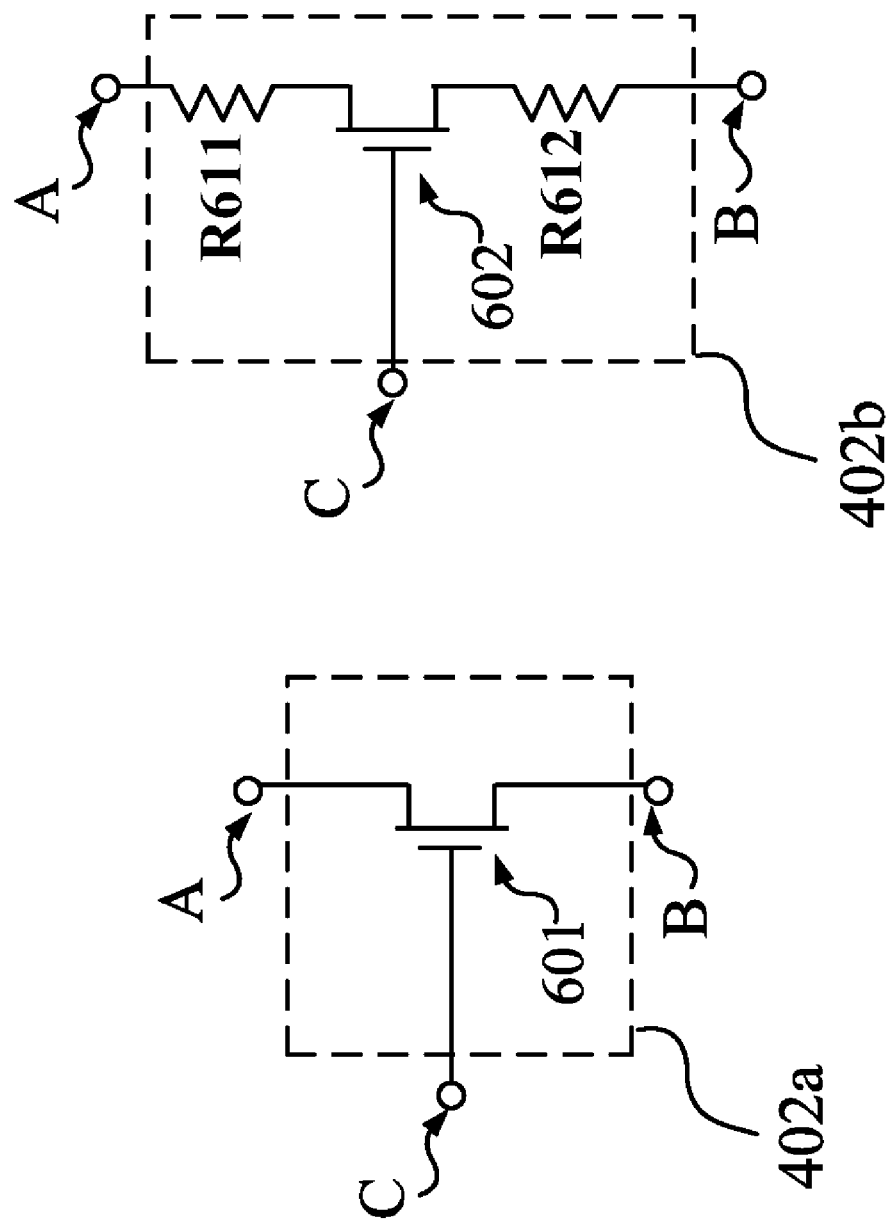
FIGS. 6a and 6b respectively illustrate different embodiments of the variable resistive unit with continuous mode in accordance with the present invention.

FIGS. 6a and 6b illustrate different embodiments of the variable resistive unit 402 with continuous mode (see FIG. 4b) in accordance with the present invention. In FIG. 6a, a variable resistive unit 402a includes a transistor 601 for providing a continuously variable resistance between the nodes A and B, wherein the transistor 601 may be a field-effect transistor (FET). The source and drain of transistor 601 are respectively connected to the nodes A and B. The gate of transistor 601 is connected to the node C for a control signal from the signal control unit 403 (FIG. 4b) to be applied to the transistor 601 so as to determine the equivalent resistance of transistor 601. In FIG. 6b, a variable resistive unit 402b includes a transistor 602, a resistor R611 and a resistor R612 for providing a continuously variable resistance between the nodes A and B, wherein the transistor 602 may be a field-effect transistor (FET). The resistor R611 is connected between the source/drain of transistor 602 and node A, and resistor R612 is connected between the drain/source of transistor 602 and node B. The gate of transistor 602 is connected to the node C for a control signal from the signal control unit 403 (FIG. 4b) to be applied to the transistor 602 so as to determine the equivalent resistance of transistor 602.

Figure 7:
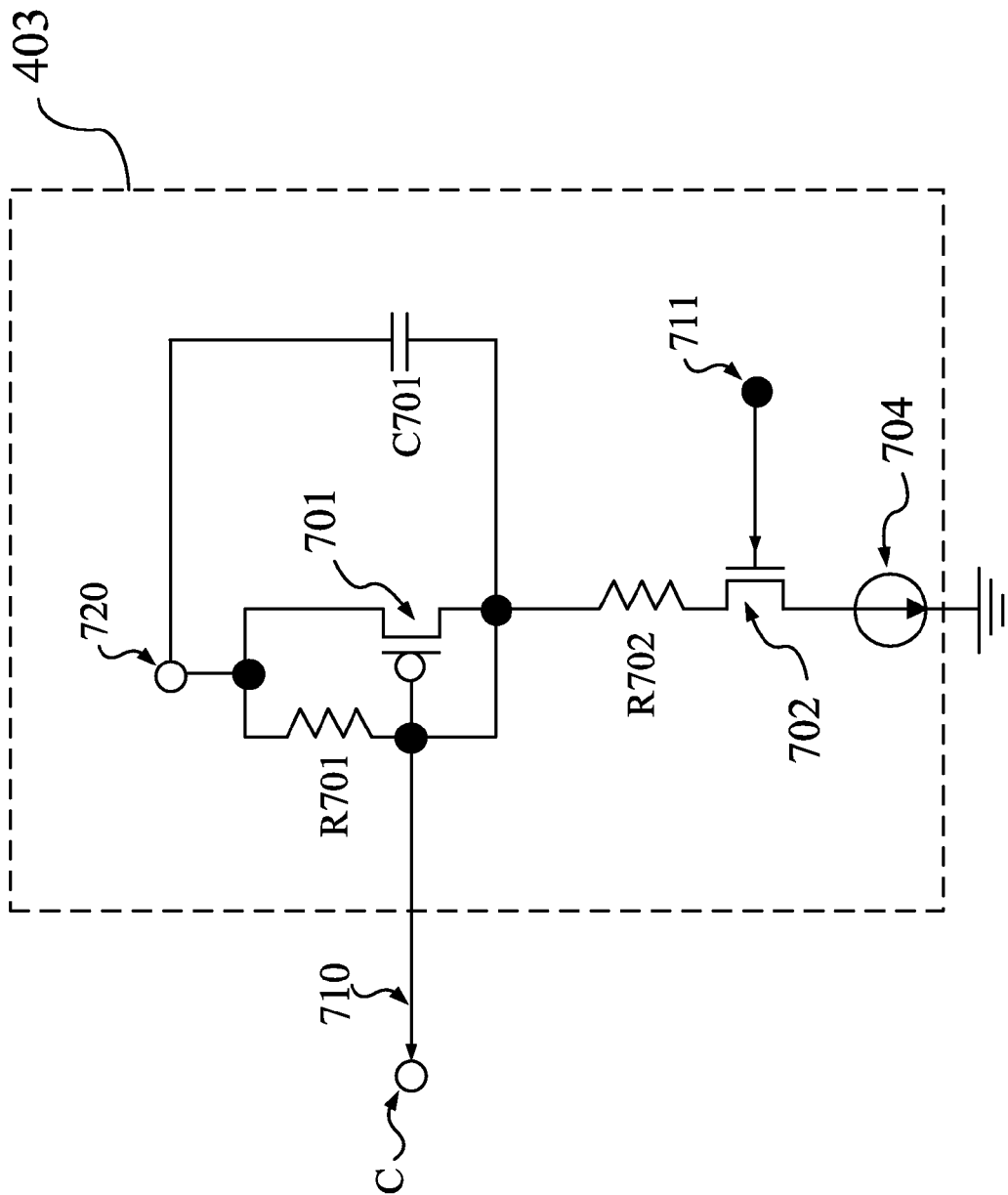
FIG. 7 illustrates a detailed circuit of a signal control unit according to the present invention.

FIG. 7 illustrates an example of the signal control unit 403 (see FIG. 4b). The signal control unit 403 comprises a p-channel MOSFET (Metal-Oxide Semiconductor Field-Effect Transistor, p-MOSFET) 701, an n-channel MOSFET (n-MOSFET) 702, two resistors R701, R702, a capacitor C701 and a current source 704. The source of p-MOSFET 701 and a first end of resistor R701 are connected to a node 720. The gate and drain of p-MOSFET 701 and a second end of resistor R701 are connected together to the node C. A first end of capacitor C701 is connected with the gate and drain of p-MOSFET 701 and a second end of capacitor C701 is connected to the node 720. The drain of p-MOSFET 701 is further connected to a first end of resistor R702. A second end of resistor R702 is connected to the drain of n-MOSFET 702. The gate of n-MOSFET 702 is connected to a switch node 711. The current source 704 is connected between the source of n-MOSFET 702 and ground. Furthermore, the node 720 is used to receive a steady voltage, such as Vcc voltage.

The signal control unit 403 starts to output a control signal 710 to the node C as long as the gate of n-MOSFET 702 receives a turn-on signal from the switch node 711 for turning-on the n-MOSFET 702. The capacitor C701 will be discharged for outputting the control signal 710 to the node C after the n-MOSFET 702 is turned on. The node C is connected to the variable resistive unit 402 (see FIG. 4b) for adjusting the equivalent resistance thereof. In FIGS. 6a and 6b, accordingly, the respective gates of transistors 601, 602 can receive the control signal from the node C for adjusting the equivalent resistance of the variable resistive unit (e.g. 402a, 402b).

Figure 8:
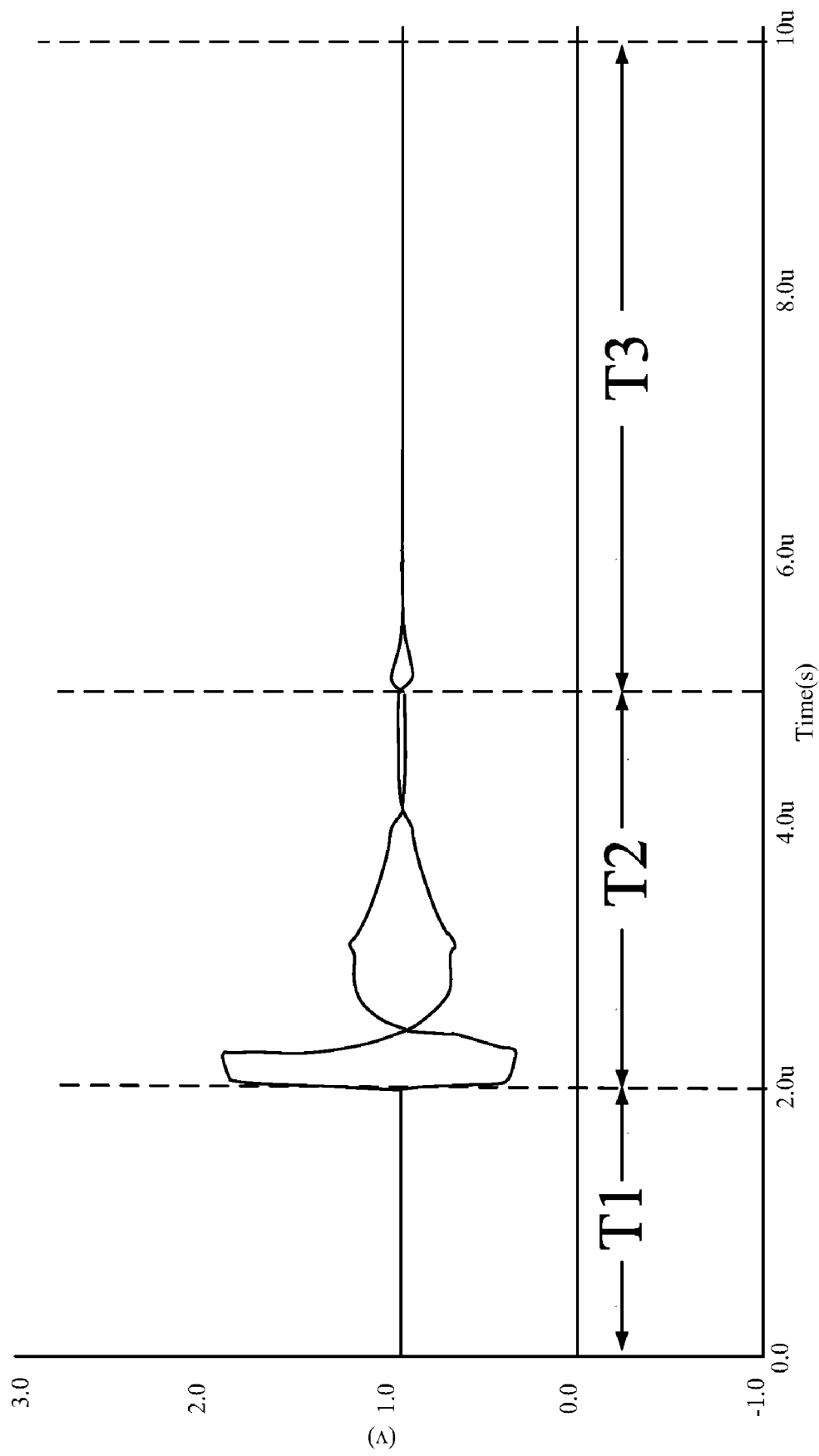
FIGS. 8 and 9 respectively show a DC frequency response and an AC frequency response of the present invention.
Figure 9:
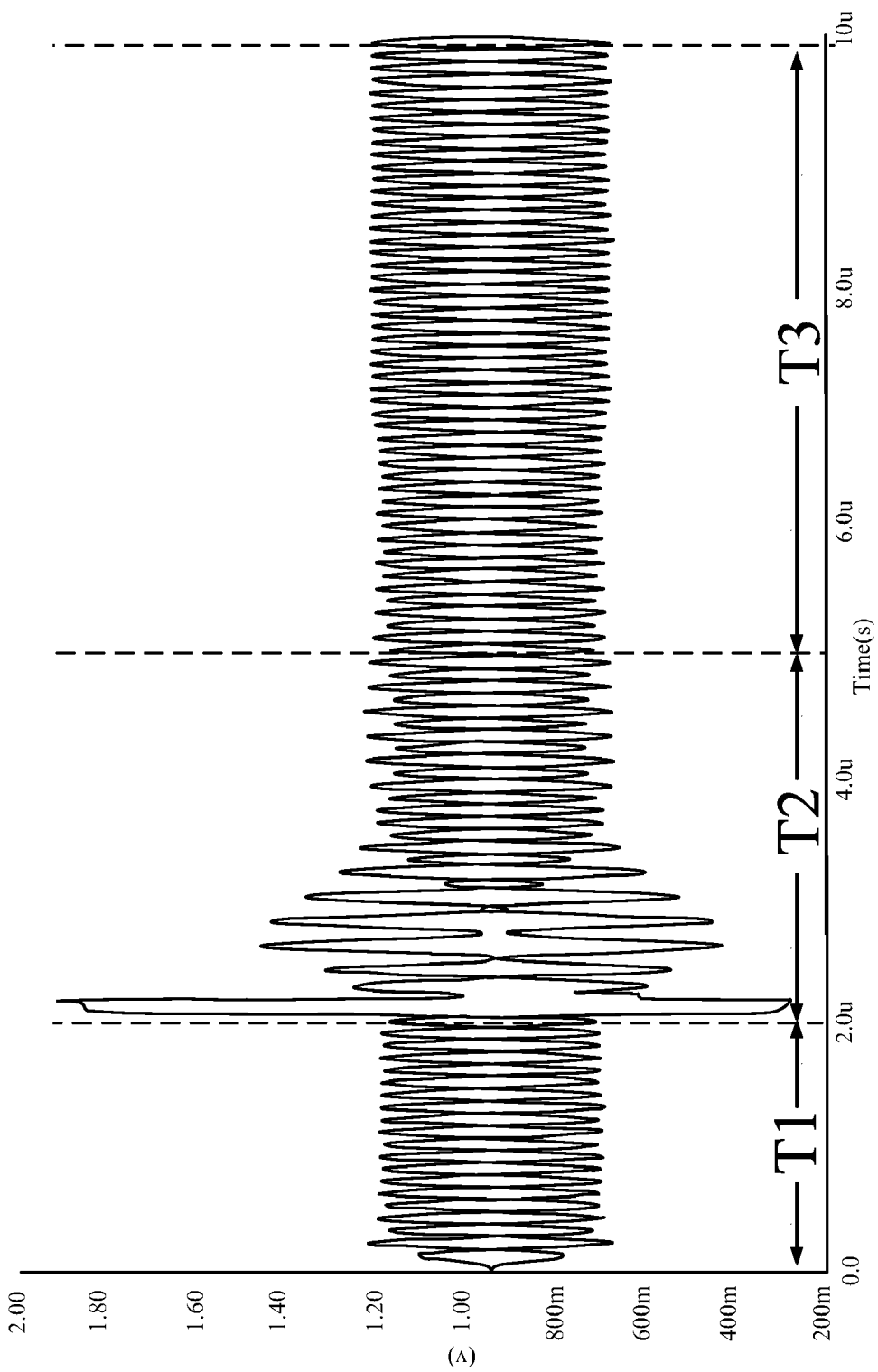

FIGS. 8 and 9 show a DC frequency response and an AC frequency response of the present invention. A DC offset is not occurred yet during the period T1 (0 μs to 2 μs). After the DC offset is occurred at the beginning of the period T2 (starts at 2 μs), the variable resistive unit 301 starts to vary the equivalent resistance thereof in order to canceling the DC offset. It is obvious that the DC offset is rapidly diminished during 2 μs to 4 μs, in other words, the DC offset can be maximally diminished during a period of only 2 μs by utilizing the present invention. Therefore, the DC offset is almost canceled at the beginning of the period T3 (starts at 5 μs).

In contrast to the prior art, the circuit of the present invention is capable of providing a variable RC time-constant. The circuit with variable RC time-constant can rapidly cancel the DC offset within a directly down converted signal by the variable cut-off frequency due to the variable RC time-constant. Therefore, the circuit of the present invention is capable of settling the DC offset, and controlling the RC time-constant of AC-coupling when being used in the direct conversion receiver.

The method and mechanism of the embodiment in accordance with the present invention can be implemented in a way of either solid circuit within a chip or the software, without departing from the spirit and scope of the present invention for any person skilled in the art.

What is claimed is:

1. A circuit for settling DC offset in a direct conversion receiver, the circuit comprising:
    a first capacitor having a first end connected to a first input node and a second end connected to a first output node;
    a second capacitor having a first end connected to a second input node and a second end connected to a second output node;
    a first resistor having a first end connected to a bias node and a second end connected to the first output node;
    a second resistor having a first end connected to the bias node and a second end connected to the second output node; and
    a variable resistive unit having a first end connected to the first output node and a second end connected to the second output node.

2. The circuit of claim 1, wherein the capacitance of the first capacitor is substantially equal to the capacitance of the second capacitor.

3. The circuit of claim 1, wherein the resistance of the first resistor is substantially equal to the resistance of the second resistor.

4. The circuit of claim 1, wherein the variable resistive unit provides a non-continuously variable resistance.

5. The circuit of claim 4, wherein the variable resistive unit comprises a plurality of resistors.

6. The circuit of claim 5, wherein the plurality of resistors comprise several sets of resistors, each set of resistors is connected to other in parallel.

7. The circuit of claim 6, wherein the variable resistive unit further comprises a plurality of switches for connecting the plurality of resistors and selectively determining an equivalent resistance of the variable resistive unit.

8. The circuit of claim 1, wherein the variable resistive unit provides a continuously variable resistance.

9. The circuit of claim 8, wherein the variable resistive unit comprises a signal control unit for providing a control signal to determine an equivalent resistance of the variable resistive unit.

10. The circuit of claim 9, wherein the variable resistive unit comprises a transistor for receiving the control signal and providing the equivalent resistance of the variable resistive unit.

11. A circuit for settling DC offset in a direct conversion receiver, comprising:
    a voltage node for receiving a bias voltage;
    a couple of input nodes for receiving a differential signal pair;
    a couple of output nodes for outputting an output signal pair generated by the circuit;
    a couple of resistors for protecting the circuit from overloading, each having a first end connected to the voltage node and a second end connected to the corresponding output node;
    a couple of capacitors, each having a first end connected to the corresponding input node and a second end connected to the corresponding output node; and
    a variable resistive unit for providing an equivalent resistance, which is connected between the couple of the output nodes.

12. The circuit of claim 11, wherein the capacitance of each capacitor is substantially equal to another.

13. The circuit of claim 11, wherein the resistance of each resistor is substantially equal to another.

14. The circuit of claim 11, wherein the variable resistive unit provides a non-continuously variable resistance.

15. The circuit of claim 14, wherein the variable resistive unit comprises several sets of resistors, each set of resistors is connected to other in parallel.

16. The circuit of claim 15, wherein the variable resistive unit further comprises a plurality of switches for connecting the plurality of resistors and selectively determining an equivalent resistance of the variable resistive unit.

17. The circuit of claim 11, wherein the variable resistive unit and the couple of capacitors constitute a high pass filter.

18. The circuit of claim 11, wherein the variable resistive unit provides a continuously variable resistance.

19. The circuit of claim 18, wherein the variable resistive unit comprises a signal control unit for providing a control signal to determine an equivalent resistance of the variable resistive unit.

20. The circuit of claim 19, wherein the variable resistive unit comprises a transistor for receiving the control signal and providing the equivalent resistance of the variable resistive unit.

* * * * *